Aug. 9, 1960  B. KARPES  2,948,077
FISHING HOOK OR LURE RETRIEVING DEVICE
Filed Sept. 26, 1958
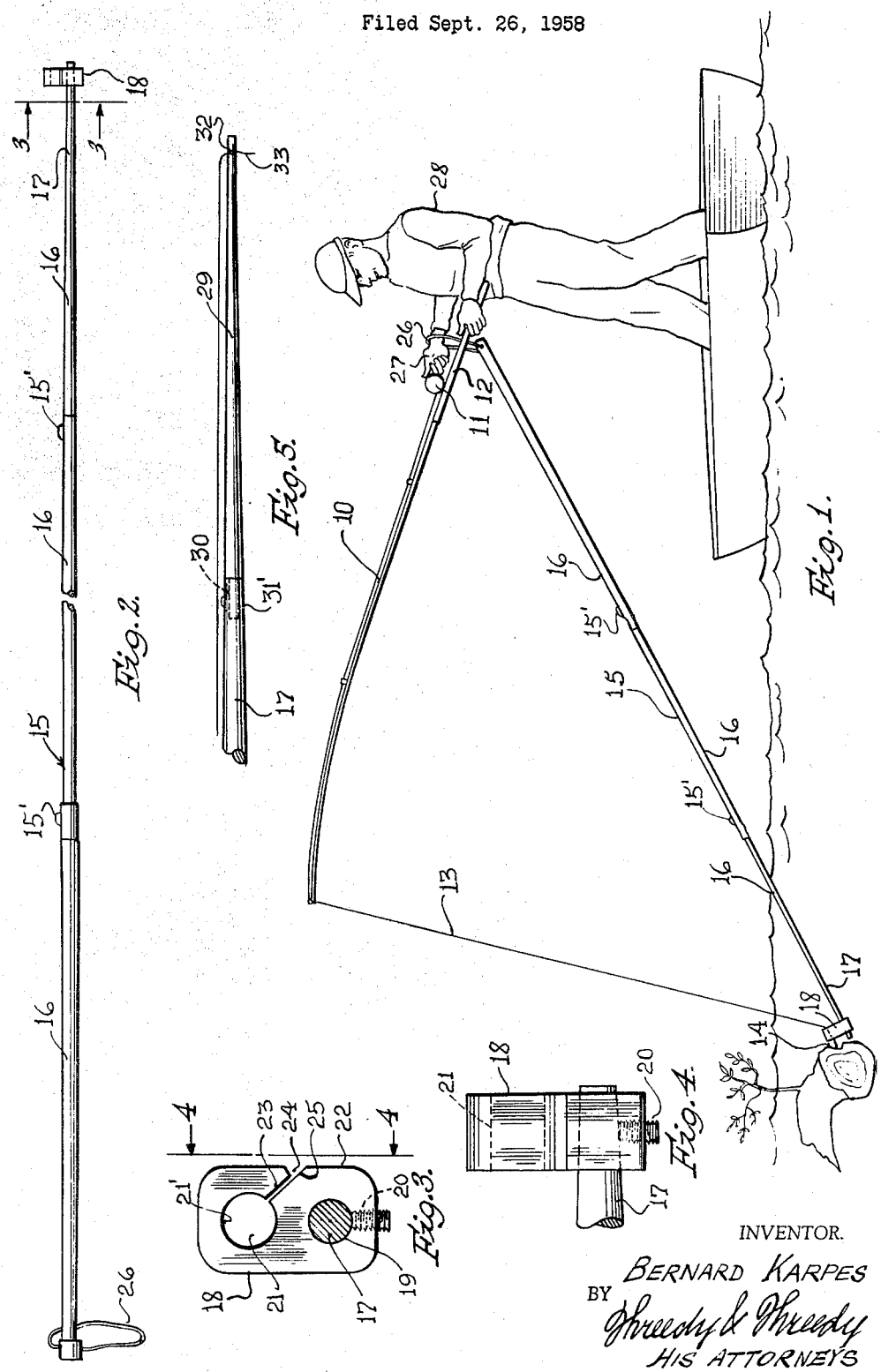
INVENTOR.
BERNARD KARPES
BY
Threedy & Threedy
HIS ATTORNEYS

2,948,077
FISHING HOOK OR LURE RETRIEVING DEVICE

Bernard Karpes, 3046 W. Irving Park Road, Chicago, Ill.

Filed Sept. 26, 1958, Ser. No. 763,551

1 Claim. (Cl. 43—17.2)

This invention relates to new and useful improvements in a fishing hook or lure retrieving device.

This application for my present invention constitutes a continuation in part of my prior application filed April 2, 1957, Serial No. 669,649 for Letters Patent on a fishing device.

An object of the present invention is to provide a fishing hook or lure retrieving device in which there is a retrieving pole of an elongated construction at one end of which is arranged a retriever head having an arrangement for receiving the snagged fishing line for guidance to a point where the hook or lure is snagged to an object such as a log or the like. At the opposite end of the retriever pole is a loop or the like whereby such opposite end may be suspended from the fisherman's wrist or arm during the retrieving operation to free his hands for manipulation of the fishing rod and the fishing line reel whereby to bring the end of the fishing rod as close as possible to the point where the hook or lure is snagged.

Another and equally important object of the invention is the provision of a retriever device of the character hereinafter described which can be manipulated with ease and convenience, by the fisherman whereby to bring the retriever head of the device and the fishing pole in close proximity with respect to each other to facilitate quick release of the snagged hook or lure.

Another and equally important object of the invention is to provide a retriever head removably fixed to the end of a retriever pole and provided with an arrangement which will permit convenient threading of a fishing line through the retriever head while resisting its withdrawal therefrom during retrieving operation.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view illustrating my retrieving device in use;

Fig. 2 is a plan view of the retrieving device;

Fig. 3 is a sectional detail view taken substantially on line 3—3 of Fig. 2;

Fig. 4 is a sectional detail view taken substantially on line 4—4 of Fig. 3;

Fig. 5 is a fragmentary side elevational view of the retriever pole embodying my invention showing an attachment thereto for still fishing.

My improved retrieving device is used in connection with conventional fishing tackle. Such tackle may be a fishing line secured to the end of a fishing rod and extending therefrom with a fishing hook. Such fishing tackle is generally used for still fishing. On the other hand, my retrieving device may be used in connection with fishing tackle especially designed for casting in which case the fishing tackle comprises a conventional fishing rod 10 having a fishing line reel 11 secured thereto at the handle end portion 12 of the rod 10. A fishing line 13 extends from the reel to the tip of the fishing rod 10 and then extends therefrom with its end portion secured to a hook 14 of any conventional design. The hook 14 may be also in the form of an artificial lure.

My improved retrieving device includes an elongated retrieving pole 15, which as shown, comprises a plurality of sections 16 telescopically arranged with respect to each other. The sections of the pole are releasably latched in extended relation with respect to each other by means of suitable spring latches 15' of any approved construction. The pole 15 may be a single length pole. In either case, the end 17 of the pole is tapered to receive the retriever head 18. The retriever head 18 is of block formation substantially rectangular in plan view. At one portion of the head 18 there is provided an opening 19 which may be tapered, if desired, to correspond to the taper of the end 17 of the pole 15. When the end 17 of the pole 15 is projected through the opening 19, the retriever head 18 is secured to said end portion preferably by a set screw 20, thus fixedly securing the retriever head 18 to the pole 15 and holding the same thereto during the retrieving operation. The other opposite portion of the head 18 is provided with an opening 21. Formed in the side wall 22 of the head 18 is a slot 23 which extends at an angle with respect to the long axis of the head 18 and preferably opens into the opening 21 at a point nearest to the mid portion of the head 18. An entrance 24 is provided for the slot 23 by forming a V-shaped groove, as shown. Such entrance is located at a point between the openings 19 and 21. This is accomplished by removing a portion of the wall 22 adjacent the slot 23. By so doing a flat surface 25 is provided at the entrance 24 whereby the fishing line 13 may be readily threaded through the slot 23 in the opening 21. When the retrieving head is in operation, the weight thereof will dispose the line at the top portion 21' of the opening 21 away from the slot 23 and thereby, by reason of the location of such slot 23, the fishing line can not be accidentally unthreaded from the head 18.

The pole 15 at its end opposite the end carrying the retriever head 18 has secured thereto a loop 26. This loop 26 is preferably flexible and is of a size to permit ready passage therethrough of the hand 27 of the fisherman 28 which is used to operate the reel 11. When the hand 27 is projected through the loop 26, the fishing rod 15 will be suspended from such arm. This frees such hand so that he may firmly hold the fishing pole 10 while manipulating the reel 11 to bring the end of the rod as close as possible to the point where the hook 14 or lure, as the case may be, is snagged. Such an arrangement also permits the weight of the pole 15 to be disposed on the retriever head 18. Such weight will bear the retriever head upon the line 13 at the point where the hook or lure is snagged.

With the weight of the pole 15 disposed on the retriever head, the fishing line will be in the upper-most portion 21' of the opening 21 of the retriever head 18 and as before stated, in this position of the fishing line with respect to the retriever head, the line cannot accidentally be threaded outwardly through the slot 23 during the retrieving operation. The conventional brake on the fishing reel is effective to hold the line 13 taut while the fisherman releases his hand 27 from the reel and firmly grasps the loop bearing end of the retriever pole 15. In this manner the fisherman is able to manipulate the retriever pole as well as the fishing rod to bring about release of the hook or lure from snagged engagement with the log or other object.

While I have shown the retriever head substantially triangular in plan view, it is obvious that it may assume other forms without minimizing the advantages and objects of the invention.

When the pole 15 comprises removable sectional parts, it can be conveniently distended and stored away while not in use.

The construction and arrangement of parts of my improved retriver device permits the fisherman to free his hands from the retriever pole so as to manipulate the boat and the fishing pole to bring the boat and the pole to a point adjacent where the hook or lure is snagged to the log or the like. Because of this close proximity, the snagged hook or lure can be in the manner hereinbefore stated, very quickly and with a minimum degree of effort on the part of the fisherman, removed without danger of breakage of line, fishing pole or retriever pole.

In Fig. 5, I have illustrated an attachment for the retriever pole. This attachment comprises an elongated section 29 which may be provided with a reduced stud 30 frictionally insertable in the end portion 31' of the section 17 of the retriever pole 15. The outer end of the section 29 is provided with an opening 32 through which a fishing line 33 may be threaded. With the section 29 attached to the retriever pole, the pole may be used for the dual purpose of still fishing or the like as well as a retriever pole, the latter being accomplished by the removal of the section 29 and the mounting on the section 17 of the retriever head 18.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

A fishing hook and lure retrieving device comprising an elongated pole, an arm supported element at one end of the pole to permit the pole to be freely suspended from an arm of a fisherman, a retrieving head at the opposite end of said pole, said head comprising a rectangularly shaped body having spaced apart adjacent openings formed therethrough, one of said openings arranged to receive the end of a pole and the other to have a fishing line extended therethrough, one of the side walls of said body having a slot formed therein extending at an angle with respect to the long axis of the body bisecting the openings, said slot communicating with said other opening and having an entrance located in said one side wall of said body at a point between said openings for receiving said fishing line, said retrieving head bearing upon said line adjacent the point where a hook or lure on said line is snagged to a log or the like in a direction opposite to the normal direction of said line when the latter is freely suspended from the arm of the fisherman.

References Cited in the file of this patent

UNITED STATES PATENTS

| | | |
|---|---|---|
| 173,534 | Endicott | Feb. 15, 1876 |
| 2,467,269 | Miller | Apr. 12, 1949 |
| 2,533,905 | Aconley | Dec. 12, 1950 |
| 2,607,149 | Cox | Aug. 19, 1952 |
| 2,645,051 | Stofleth | July 14, 1953 |
| 2,758,406 | Childress | Aug. 14, 1956 |